US010694169B1

(12) United States Patent
Topliss et al.

(10) Patent No.: US 10,694,169 B1
(45) Date of Patent: Jun. 23, 2020

(54) DEPTH MAPPING WITH POLARIZATION AND FOCUS PIXELS

(71) Applicant: Apple Inc., Cupertino, CA (US)

(72) Inventors: Richard J. Topliss, Campbell, CA (US); Albert A. Ho, Mountain View, CA (US); Thomas M. Gregory, Cupertino, CA (US); Ning Y. Chan, Palo Alto, CA (US); Richard H. Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1136 days.

(21) Appl. No.: 14/827,135

(22) Filed: Aug. 14, 2015

(51) Int. Cl.
*G06T 17/00* (2006.01)
*H04N 13/271* (2018.01)
*G06T 7/00* (2017.01)
*G06T 7/40* (2017.01)

(52) U.S. Cl.
CPC ........... *H04N 13/271* (2018.05); *G06T 7/004* (2013.01); *G06T 7/0057* (2013.01); *G06T 7/0069* (2013.01); *G06T 7/408* (2013.01); *G06T 17/00* (2013.01); *G06T 2207/10004* (2013.01); *G06T 2207/10024* (2013.01); *G06T 2207/10028* (2013.01); *G06T 2207/10148* (2013.01); *G06T 2207/20228* (2013.01); *G06T 2207/30232* (2013.01); *G06T 2210/61* (2013.01)

(58) Field of Classification Search
CPC .. H04N 13/271; H01L 27/14625; G06T 17/00
See application file for complete search history.

(56) References Cited

U.S. PATENT DOCUMENTS

| | | | |
|---|---|---|---|
| 7,656,541 B2 | 2/2010 | Waslowski et al. | |
| 8,878,969 B2* | 11/2014 | Holscher | H01L 27/14621 348/273 |
| 2009/0041971 A1* | 2/2009 | Wang | G02B 5/1809 428/54 |
| 2012/0274834 A1* | 11/2012 | Gidon | H01L 27/14621 348/345 |
| 2012/0319222 A1* | 12/2012 | Ozawa | H01L 27/14605 257/432 |
| 2013/0062522 A1* | 3/2013 | Jiang | H01L 27/14609 250/338.4 |
| 2013/0222552 A1 | 8/2013 | Agranov et al. | |

(Continued)

*Primary Examiner* — Zhubing Ren
(74) *Attorney, Agent, or Firm* — Robert C. Kowert; Kowert, Hood, Munyon, Rankin & Goetzel, P.C.

(57) ABSTRACT

In some embodiments, an image sensor structure includes a super-pixel sensor comprising a plurality of micro-pixel sensors. The image sensor structure includes a plurality of micro-lenses affixed to focus light on the plurality of micro-pixel sensors. In some embodiments, each micro-lens of the plurality of micro-lenses directs light to locations on a respective one or more of the plurality of micro-pixel sensors. In some embodiments, the image sensor structure includes one or more color filters affixed at locations for filtering light directed by the micro-lenses to a first set of color image micro-pixel sensors comprising one or more of the plurality of micro-pixel sensors for capturing color image data and one or more polarization filters affixed at locations for filtering light directed by the micro-lenses to a second set of polarization micro-pixel sensors comprising one or more of the plurality of micro-pixel sensors for capturing depth map data.

20 Claims, 12 Drawing Sheets

(56) References Cited

U.S. PATENT DOCUMENTS

| | | |
|---|---|---|
| 2014/0184748 A1 | 7/2014 | Gharib et al. |
| 2014/0267850 A1 | 9/2014 | Li et al. |
| 2014/0320656 A1 | 10/2014 | Foley |
| 2015/0035980 A1* | 2/2015 | Krokel .................. G01N 21/21 348/148 |
| 2015/0206912 A1* | 7/2015 | Kanamori ............ G02B 26/001 250/208.1 |
| 2015/0304582 A1* | 10/2015 | Hirota .................... H04N 5/378 348/49 |
| 2015/0350583 A1* | 12/2015 | Mauritzson ............ H04N 5/378 250/208.1 |
| 2016/0037097 A1* | 2/2016 | Duparre ................ B82Y 30/00 348/241 |
| 2016/0286108 A1* | 9/2016 | Fettig .................. H04N 5/2355 |

* cited by examiner

US 10,694,169 B1

DEPTH MAPPING WITH POLARIZATION AND FOCUS PIXELS

BACKGROUND

Technical Field

This disclosure relates generally to depth mapping and more specifically to depth mapping in color image sensors.

Description of the Related Art

The advent of small, mobile multipurpose devices such as smartphones and tablet or pad devices has resulted in a need for high-resolution, small form factor cameras for integration in the devices. Simultaneously, research in computerized graphics processing has long sought to extract data for modeling three-dimensional features of a feature portrayed in an image from two-dimensional images of the feature. Researchers have sought to express data for modeling three-dimensional features of an item in several ways: depth maps, surface normal vectors, surface gradients, and surface slant and tilt. Depth can be considered either as the relative distance from a camera to surface points or the relative surface height above the x-y plane. Surface normal vectors are the orientation of a vector perpendicular to a tangent plane on the object surface.

In computer vision, the techniques to recover shape are called shape-from-X techniques, where X can be shading, stereo, motion, texture, etc. Each such technique represents an attempt to extract from a data representation of incoming light at a sensor the three dimensional features of the object off which the light has most recently reflected. Shape-from-x techniques encounter various limitations on their applicability.

SUMMARY OF EMBODIMENTS

Some embodiments include an image sensor structure for capturing visible light intensity and polarization data. In some embodiments, the image sensor structure includes a super-pixel sensor including a plurality of micro-pixel sensors. In some embodiments, the image sensor structure includes a plurality of micro-lenses affixed to focus light on the plurality of micro-pixel sensors. In some embodiments, each micro-lens of the plurality of micro-lenses directs light to locations on a respective one or more of the plurality of micro-pixel sensors. In some embodiments, the image sensor structure includes one or more color filters affixed at locations for filtering light directed by the micro-lenses to a first set of color image micro-pixel sensors including one or more of the plurality of micro-pixel sensors for capturing color image data and one or more polarization filters affixed at locations for filtering light directed by the micro-lenses to a second set of polarization micro-pixel sensors including one or more of the plurality of micro-pixel sensors for capturing depth map data.

Figure 1:
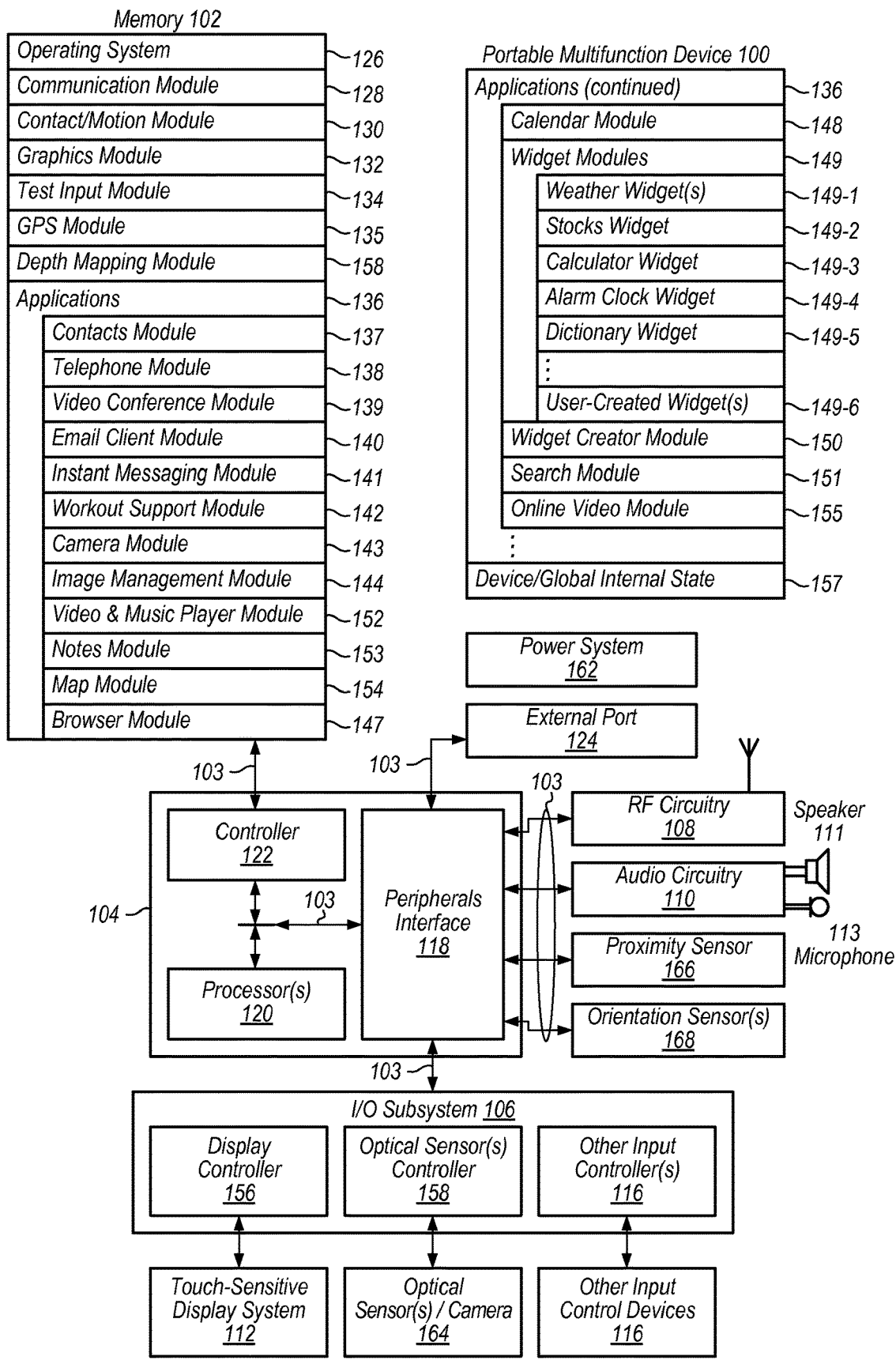
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Including." This term is open-ended. As used in the appended claims, this term does not foreclose additional structure or steps. Consider a claim that recites: "An apparatus including one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Depth Mapping with Polarization and Focus Pixels

Some embodiments include camera equipment outfitted with an image sensor structure for capturing light intensity and polarization data. Some embodiments include equipment for calculating or estimating from data derived from color micropixels with micro-lenses configured to cover the multiple micropixels, taking advantage of angular sensitivity developed in the micropixels by the placement of the microlenses. In some embodiments, the placement of the microlens creates effects analogous to shifts in the perspective of the multiple micropixels. In some embodiments, a disparity estimate is calculated.

In some embodiments, color pixel disparity information yields a coarse relative depth map of nearby objects in the scene, even if the depth map does not yield fine surface geometry. In some embodiments, polarization data may yield fine surface geometry of continuous surfaces even when unable to provide the relative depths of different surfaces/objects in the scene. In some embodiments, disparity and polarization data are complementary measurements of depth and are combinable. Some embodiments generate a first variety of depth map data from micro-lenses covering multiple pixels (color pixels, disparity based), such as those shown in FIGS. 6-7 and discussed below. Some embodiments generate a second variety depth map data from polarization surface normal data (e.g., polarization data derived from multiple filters, for example 3 (0, 60, and 120 deg) or 4 filters (0, 45, 90 and 135 deg)), such as those shown in FIGS. 4-7 and discussed below. In some embodiments, both varieties of depth map data are combined to build up a depth map which has both coarse relative depths of objects (from color image disparity) and fine surface detail (from polarization). In some embodiments, color data is also fused to the depth map.

In some embodiments, a super-pixel sensor including a plurality of micro-pixel sensors. In some embodiments, a plurality of micro-lenses is affixed to focus light on the plurality of micro-pixel sensors. In some embodiments, each micro-lens of the plurality of micro-lenses directs light to locations on a respective one or more of the plurality of micro-pixel sensors. In some embodiments, one or more color filters is affixed at locations for filtering light directed by the micro-lenses to a first set of color image micro-pixel sensors including one or more of the plurality of micro-pixel sensors for capturing color image data. In some embodiments, one or more polarization filters is affixed at locations for filtering light directed by the micro-lenses to a second set of polarization micro-pixel sensors including one or more of the plurality of micro-pixel sensors for capturing depth map data. In some embodiments, the one or more polarization filters include diffraction gratings with a spacing smaller than a wavelength of light intended to be filtered for polarization selection or sensitivity. As one of ordinary skill in the art will readily comprehend in light of having read the present disclosure, in other embodiments, the one or more polarization filters include sub wavelength structures offering similar polarization selection or sensitivity without use of a grating.

In some embodiments, the one or more polarization filters include gratings including lithographically deposited tungsten, or another suitable material, such as aluminum. In some embodiments, the one or more polarization filters include gratings aligned for filtering light of a first polarization, and gratings aligned for filtering light of a polarization orthogonal to the first polarization. In some embodiments, the one or more polarization filters include one or more polarization filters affixed at locations for filtering light directed by respective individual ones of the micro-lenses to individual ones of the set of polarization micro-pixel sensors.

In some embodiments, the one or more polarization filters include one or more polarization filters affixed at locations for filtering light directed by respective individual ones of the micro-lenses to groups including pluralities of polarization micropixel sensors of the set of polarization micro-pixel sensors. In some embodiments, a quantity of the polarization micro-pixel sensors including the one or more of the plurality of micro-pixel sensors for capturing depth map data is equal to quantities of the one or more of the plurality of micro-pixel sensors for capturing color image data for each color of a plurality of colors captured by the plurality of micro-pixel sensors for capturing color image data.

In some embodiments, a quantity of the polarization micro-pixel sensors including the one or more of the plurality of micro-pixel sensors for capturing depth map data is equal to a quantity of the one or more of the plurality of micro-pixel sensors for capturing color image data for a color of a plurality of colors captured by the plurality of micro-pixel sensors for capturing color image data.

Some embodiments include a camera module. In some embodiments, the camera module includes a super-pixel sensor including a plurality of micro-pixel sensors; In some embodiments, the camera module includes a plurality of micro-lenses affixed to an image sensor structure at an angle calculated to direct light to the plurality of micro-pixel sensors. In some embodiments, each of the plurality of micro-lenses directs light to locations on a respective one or more of the plurality of micro-pixel sensors. In some embodiments, the camera module includes a plurality of color filters affixed at locations for filtering light directed by the micro-lenses to a first set of micro-pixel sensors including one or more of the plurality of micro-pixel sensors. In some embodiments, the camera module includes a plurality of polarization filters affixed at locations for filtering light directed by the micro-lenses to a second set of micro-pixel sensors including one or more of the plurality of micro-pixel sensors.

In some embodiments, the plurality of micropixel sensors share a floating diffusion node. In some embodiments, the one or more polarization filters include gratings aligned for filtering light of a first polarization, gratings aligned for filtering light of a second polarization orthogonal to the first polarization, gratings aligned for filtering light of a third polarization halfway between the first polarization and the second polarization, and gratings aligned for filtering light of a fourth polarization antiparallel to the third polarization.

In some embodiments, a quantity of the polarization micro-pixel sensors including the one or more of the plurality of micro-pixel sensors for capturing depth map data is equal to quantities of the one or more of the plurality of micro-pixel sensors for capturing color image data for each color of a plurality of three colors captured by the plurality of micro-pixel sensors for capturing color image data.

In some embodiments, a quantity of the polarization micro-pixel sensors including the one or more of the plurality of micro-pixel sensors for capturing depth map data is greater than quantities of the one or more of the plurality of micro-pixel sensors for capturing color image data for each color of a plurality of two colors captured by the plurality of micro-pixel sensors for capturing color image data and less than a quantity of one or more of the plurality of micro pixel sensors for capturing color image data for a third color captured by the plurality of micro-pixel sensors.

In some embodiments, the one or more polarization filters include one or more polarization filters affixed at locations for filtering light directed by respective individual ones of the micro-lenses to groups including pluralities of polarization micropixel sensors of the set of polarization micro-pixel sensors, wherein each micro-lens directs light to a micropixel sensor for capturing depth map data and a corresponding plurality of micropixel sensors for capturing color image data of a selected color.

In some embodiments, the one or more polarization filters include one or more polarization filters affixed at locations for filtering light directed by respective individual ones of the micro-lenses to individual ones of the set of polarization micro-pixel sensors, and the plurality of micro-pixel sensors for capturing color image data include groups of one or more micropixel sensors sharing a common microlens among the group. In some embodiments, no color filter or infrared filter above the polarization micropixels is applied. In some such embodiments, an arrangement with no color filter or infrared filter above the polarization micropixels applied allows more light to penetrate through to the micropixel and thereby compensates for attenuation brought about by the inclusion of a polarization-sensitive element or polarization-selective element.

In some embodiments, the camera module includes a circuit for adding output of the plurality of polarization micropixel sensors for use as a simulated intensity pixel sensor.

In some embodiments, the camera module includes a circuit for adding output of the plurality of polarization micropixel sensors for use as a simulated intensity pixel sensor and doubling the output of the simulated intensity pixel sensor to compensate for light loss through the polarization filters.

Some embodiments include a method for generating depth map data. In some embodiments, the method includes a plurality of micro-lenses focusing light on a plurality of micro-pixel sensors, wherein each micro-lens of the plurality of micro-lenses directs light to locations on a respective one or more of the plurality of micro-pixel sensors. In some embodiments, the method includes one or more color filters filtering light directed by the micro-lenses to a first set of color image micro-pixel sensors including one or more of the plurality of micro-pixel sensors for capturing color image data. In some embodiments, the method includes the first set of color image micro-pixel sensors capturing color image data. In some embodiments, the method includes one or more polarization filters filtering light directed by the micro-lenses to a second set of polarization micro-pixel sensors including one or more of the plurality of micro-pixel sensors for capturing depth map data. In some embodiments, the method includes the second set of polarization micro-pixel sensors capturing depth map data.

In some embodiments, the method includes constructing a depth map from the depth map data. In some embodiments, the method includes constructing a depth map from the depth map data, constructing a color image from the color image data, and associating the depth map data with the color image data to build a color-image and depth map data structure.

In some embodiments, the method includes adding output of the plurality of polarization micropixel sensors for use as a simulated intensity pixel sensor and doubling the output of the simulated intensity pixel sensor to compensate for light loss through the polarization filters.

Multifunction Device Examples

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1 is a block diagram illustrating portable multifunction device 100 with camera 164 in accordance with some embodiments of methods, systems, and apparatus for depth mapping with polarization and focus pixels in small form factor cameras. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164 adapted for depth mapping with polarization and focus pixels in small form factor cameras. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 28 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 28 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image, video, and/or a depth map. In conjunction with imaging module 143 (also called a camera module), optical sensor 164 may capture still images, video, and/or depth maps. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for video-conferencing while the user views the other video conference participants on the touch screen display. While a depth mapping module 158 is explicitly shown in FIG. 1, a person of ordinary skill in the art will readily ascertain, in light of having read the present disclosure, that the methods, processes and systems described herein may be implemented in many of the hardware and software components and systems described herein without departing from the scope and intent of the present disclosure.

Device 100 may also include one or more proximity sensors 166. FIG. 28 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 28 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, depth mapping module 158 and applications (or sets of instructions) 136. Furthermore, in some embodiments memory 102 stores device/global internal state 157. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images and depth mapping;
  image management module 144;
  browser module 147;
  calendar module 148;

widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which may be made up of a video player module and a music player module;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
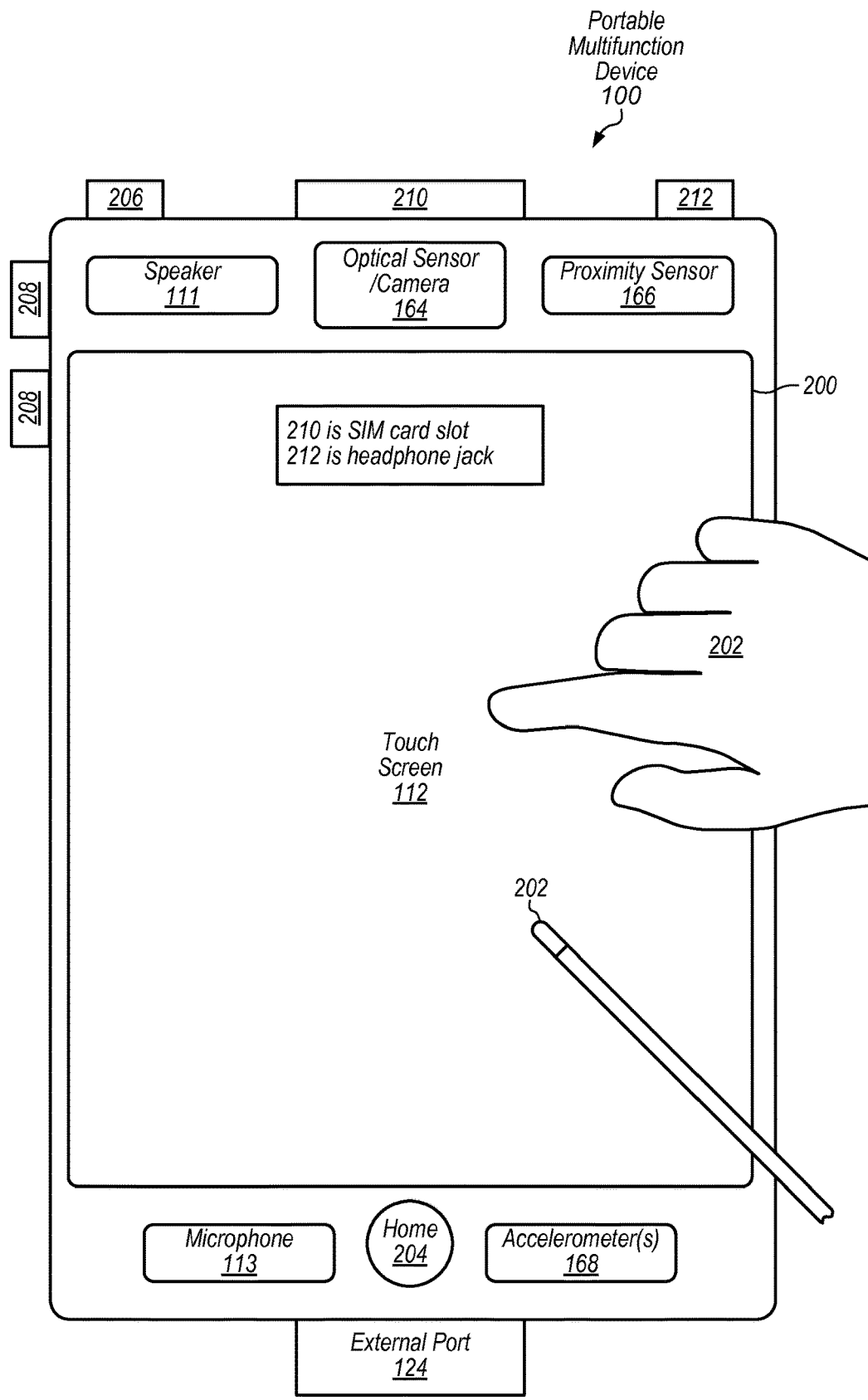
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the examples herein are given with reference to optical sensor/camera 164 (on the front of a device), a rear-facing camera or optical sensor that is pointed opposite from the display may be used instead of or in addition to an optical sensor/camera 164 on the front of a device.

Figure 3:
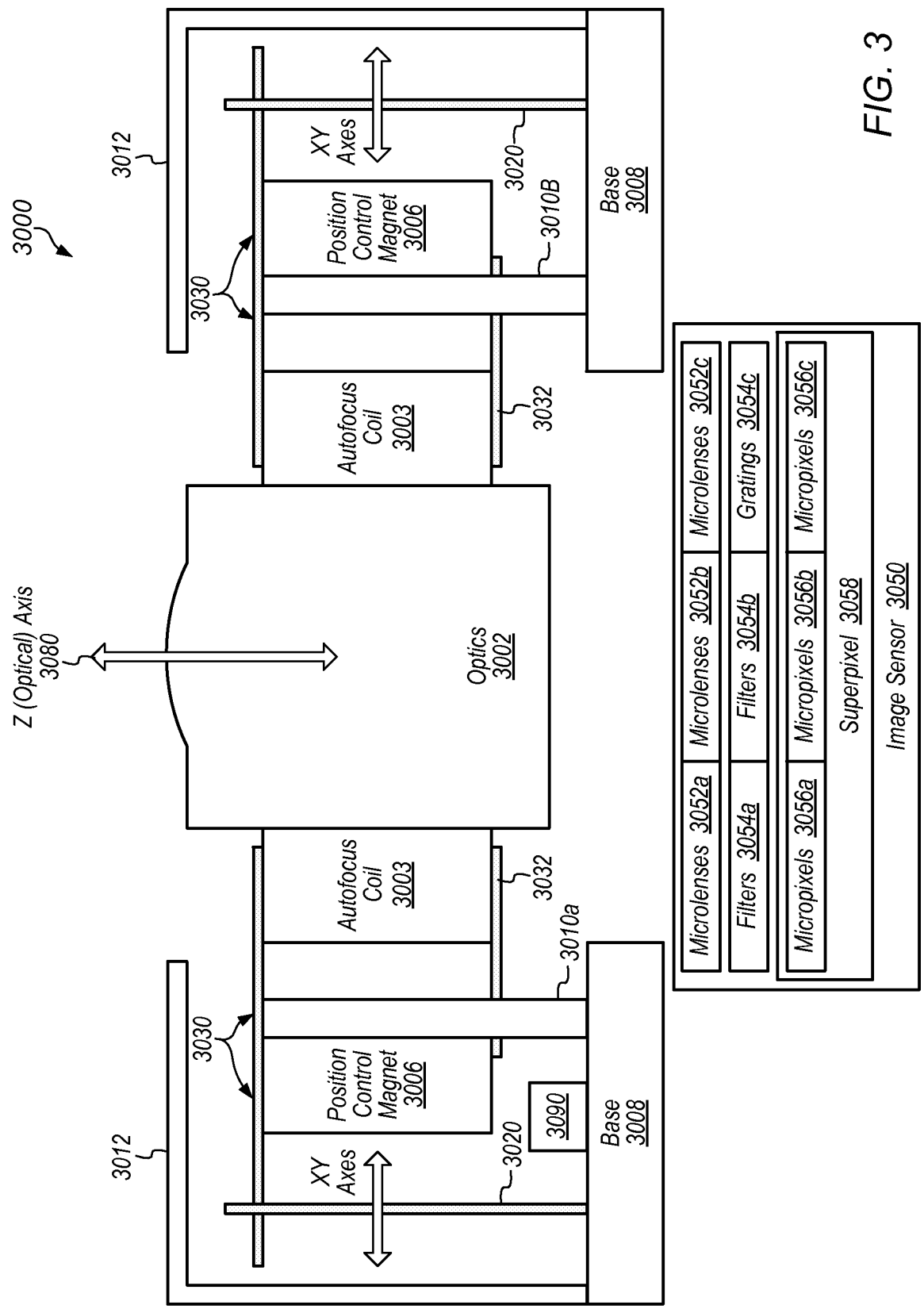
FIG. 3 illustrates a top view of an example embodiment of a camera module or assembly that may, for example, be used to provide depth mapping with polarization and focus pixels in small form factor cameras, according to at least some embodiments.

FIG. 3 depicts a side view of an example embodiment of an actuator module or assembly that may, for example, be used to provide depth mapping with polarization and focus pixels in small form factor cameras, according to at least some embodiments. Further, a camera module such as that shown in FIG. 3, in addition to providing depth mapping functions as described herein, may also use the depth mapping information as input to functions that control components described with respect to FIGS. 1-3, for example for focus functions.

Embodiments of depth mapping with polarization and focus pixels may be applied within a camera, actuator package or image sensor assembly 3000 interacting with an image sensor 3050 as illustrated in FIG. 3 to stabilize and increase control performance of an optics assembly 3002 suspended on wires 3020 within an actuator package 3000a-c as shown in FIG. 3. Details of example embodiments, implementations, and methods of operations of image sensor 3050, micropixels 3056, gratings and filters 3054, optional microlenses 3052 and associated sensors such as are shown in the camera package 3000 shown are discussed below with respect to FIGS. 4-7.

In some embodiments, each position control magnet 3006 is poled so as to generate a magnetic field, the useful component of which for the autofocus function is orthogonal to the optical axis of the camera/lens, and orthogonal to the plane of each magnet 3006 proximate to the autofocus coil 3004, and where the field for all four magnets 3006 are all either directed towards the autofocus coil 3004, or away from it, so that the Lorentz forces from all four magnets 3004 act in the same direction along the optical axis 3080.

As shown in FIG. 3, an actuator package 3000 may include a base assembly or substrate 3008, an optics assembly 3002, and a cover 3012. Base assembly 3008 may include one or more of, but is not limited to, a base 3008, supporting one or more position sensors (e.g., capacitor plates) 3010*a-b*, and suspension wires 3020, which enable a depth mapping with polarization and focus pixels for control of movements of autofocus coil 3004.

In at least some embodiments, there are four suspension wires 3020. An optics assembly 3002 may be suspended on the base assembly 3008 by suspension of the upper springs 3040 of optics assembly 3000 on the suspension wires 3020. Actuator module 3000 may include one or more of, but is not limited to, optics 3002, optics holder (autofocus coil) 3004, magnet(s) 3006, upper spring(s) 3040, and lower spring(s) 3042. The upper and lower spring(s) may be collectively referred to herein as optics springs. In optics assembly 3000, an optics component 3002 (e.g., a lens or lens assembly) may be screwed, mounted or otherwise held in or by an optics holder (autofocus coil) 3004. In at least some embodiments, the optics 3002/optics holder (autofocus coil) 3004 assembly may be suspended from or attached to the position control magnets 3006 by upper spring(s) 3040, and lower spring(s) 3042, and the position control magnets 3006 may be rigidly mounted to base 3008. Note that upper spring(s) 3040 and lower spring(s) 3042 are flexible to allow the optics assembly 3000 a range of motion along the Z (optical) axis for optical focusing, wires 3020 are flexible to allow a range of motion on the XY plane orthogonal to the optical axis for optical image stabilization.

Note that, in some embodiments, an optics assembly 3000 or an actuator actuator module may not include position control magnets 3006, but may include a yoke or other structure 3006 that may be used to help support the optics assembly on suspension wires 3020 via upper sprigs 3030. However in some embodiments, optics assembly 3000 may not include elements 3006. In general, other embodiments of an optics assembly 3000 may include fewer or more components than the example optics assembly 3000 shown in FIG. 3. Also note that, while embodiments show the optics assembly 3000 suspended on wires 3020, other mechanisms may be used to suspend an optics assembly 3000 in other embodiments.

The autofocus yoke (e.g., magnets or holder(s) 3006) acts as the support chassis structure for the autofocus mechanism of actuator 3000. The lens carrier (optics holder 3004) is suspended on the autofocus yoke by an upper autofocus (AF) spring 3040 and a lower optics spring 3042. In this way when an electric current is applied to the autofocus coil, Lorentz forces are developed due to the presence of the four magnets, and a force substantially parallel to the optical axis is generated to move the lens carrier, and hence lens, along the optical axis, relative to the support structure of the autofocus mechanism of the actuator, so as to focus the lens. In addition to suspending the lens carrier and substantially eliminating parasitic motions, the upper spring 3040 and lower spring 4042 also resist the Lorentz forces, and hence convert the forces to a displacement of the lens. This basic architecture shown in FIG. 3 and is typical of some embodiments, in which optical image stabilization function includes moving the entire autofocus mechanism of the actuator (supported by the autofocus yoke) in linear directions orthogonal to the optical axis, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

At least some embodiments may achieve this two independent degree-of-freedom motion by using two pairs of optical image stabilization coils, each pair acting together to deliver controlled motion in one linear axis orthogonal to the optical axis, and each pair delivering controlled motion in a direction substantially orthogonal to the other pair. In at least some embodiments, these optical image stabilization coils may be fixed to the camera actuator support structure, and when current is appropriately applied, optical image stabilization coils may generate Lorentz forces on the entire autofocus mechanism of the actuator, moving it as desired. The required magnetic fields for the Lorentz forces are produced by the same four magnets that enable to the Lorentz forces for the autofocus function. However, since the directions of motion of the optical image stabilization movements are orthogonal to the autofocus movements, it is the fringing field of the four magnets that are employed, which have components of magnetic field in directions parallel to the optical axis.

Returning to FIG. 3, in at least some embodiments, the suspension of the autofocus mechanism on the actuator 3000 support structure may be achieved by the use of four corner wires 3020, for example wires with a circular cross-section. Each wire 3020 acts as a flexure beams capable of bending with relatively low stiffness, thus allowing motion in both optical image stabilization degrees-of-freedom. However, wire 3020 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 3020 is stiff in directions that require it to change in length, and hence the fixed points at the ends of each wire (eight points in total) will substantially form the vertices of a parallelepiped for all operational positions of the optical image stabilization mechanism.

In some embodiments, a package of processors and memory 3090 or other computer-readable medium as described herein may alternatively, in some embodiments, be omitted from actuator module 3000 and housed elsewhere in a device in which actuator package 3000 is installed.

In some embodiments, actuator package 3000 is installed in a camera of a mobile computing device.

Some embodiments include an image sensor structure 3050 for capturing visible light intensity and polarization data is presented. In some embodiments, a super-pixel sensor 3058 includes a plurality of micro-pixel sensors 3056. In some embodiments, a superpixel sensor is an image sensor array form factor including a set of individual micropixel sensors configured for converting light at an array discrete individual locations to a set of data signals. In some embodiments, a plurality of optional micro-lenses 3052a-3052c is affixed to focus light on the plurality of micro-pixel sensors 3056a-3056c. In some embodiments, microlenses 3052a-3052b are individual lenses for directing light received from optics 3002 to locations on a respective one or more of the plurality of micro-pixel sensors 3056a-3056c.

In some embodiments, one or more color filters 3054a-b is affixed at locations for filtering light directed by the micro-lenses 3052a-b to a first set of color image micro-pixel sensors 3056a-b including one or more of the plurality of micro-pixel sensors for capturing color image data 3056a-b. In some embodiments, one or more polarization filters 3054c is affixed at locations for filtering light directed by the micro-lenses 3052c to a second set of polarization micro-pixel sensors 3056c including one or more of the plurality of micro-pixel sensors 3056c for capturing depth map data 3056c.

Figure 4:
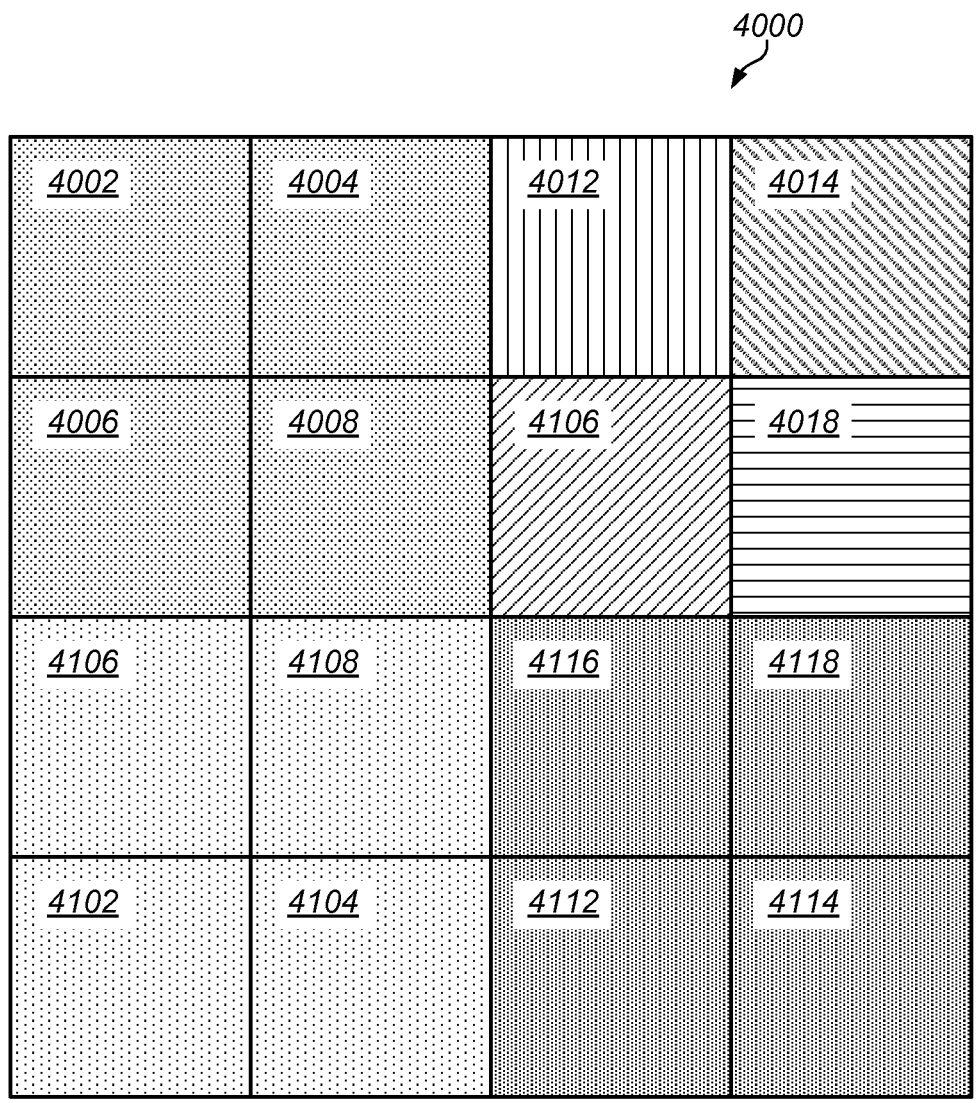
FIG. 4 depicts a pixel array representing an embodiment of an image sensor that may, for example, be used to provide depth mapping with polarization and focus pixels in small form factor cameras, according to at least some embodiments.

FIG. 4 depicts a pixel array representing an embodiment of an image sensor that may, for example, be used to provide depth mapping with polarization and focus pixels in small form factor cameras, according to at least some embodiments. An image sensor structure for capturing visible light intensity and polarization data is presented. In some embodiments, a super-pixel sensor 4000 includes a plurality of micro-pixel sensors 4002-4118. In some embodiments, a plurality of optional micro-lenses (not shown) is affixed to focus light on the plurality of micro-pixel sensors 4002-4118. In some embodiments, each micro-lens of the plurality of micro-lenses (not shown) directs light to locations on a respective one or more of the plurality of micro-pixel sensors 4002-4118.

In some embodiments, one or more color filters (not shown) is affixed at locations for filtering light directed by the micro-lenses (not shown) to a first set of color image micro-pixel sensors 4002-4118 including one or more of the plurality of micro-pixel sensors for capturing color image data 4002-4008 and 4102-4118. In some embodiments, one or more polarization filters (not shown) is affixed at locations for filtering light directed by the micro-lenses (not shown) to a second set of polarization micro-pixel sensors including one or more of the plurality of micro-pixel sensors 4002-4118 for capturing depth map data 4012-4018.

In some embodiments, the one or more polarization filters (not shown) include gratings including lithographically deposited tungsten, or another suitable material, such as aluminum. In some embodiments, the one or more polarization filters (not shown) include gratings aligned for filtering light of a first polarization (e.g., n-s at micropixel sensor 4012), and gratings aligned for filtering light of a polarization orthogonal to the first polarization (e.g., e-w at micropixel sensor 4018). As shown in FIG. 4, the gratings further include gratings aligned for filtering light of a third polarization (e.g., at micropixel sensor 4016) halfway between the first polarization and the second polarization, and gratings aligned for filtering light of a fourth polarization antiparallel to the third polarization (e.g., at micropixel sensor 4014).

In some embodiments, the one or more polarization filters (not shown) include one or more polarization filters affixed at locations for filtering light directed by respective individual ones of the micro-lenses (not shown) to individual ones of the set of polarization micro-pixel sensors 4012-4018.

In some embodiments, the one or more polarization filters (not shown) include one or more polarization filters (not shown) affixed at locations for filtering light directed by respective individual ones of the micro-lenses (not shown) to groups including pluralities of polarization micropixel sensors of the set of polarization micro-pixel sensors. In some embodiments, a quantity of the polarization micro-pixel sensors 4012-4018 including the one or more of the plurality of micro-pixel sensors for capturing depth map data 4012-4018 is equal to quantities of the one or more of the plurality of micro-pixel sensors for capturing color image data for each color of a plurality of colors captured by the plurality of micro-pixel sensors for capturing color image data (e.g., the quantity of each of red micro-pixel sensors 4002-4008, green micro-pixel sensors 4102-4108, and blue micro-pixel sensors 4112-4118).

In some embodiments, a quantity of the polarization micro-pixel sensors 4012-4018 including the one or more of the plurality of micro-pixel sensors for capturing depth map data 4012-4018 is equal to a quantity of the one or more of the plurality of micro-pixel sensors for capturing color image data for a color of a plurality of colors captured by the plurality of micro-pixel sensors for capturing color image data (e.g., the quantity of any of red micro-pixel sensors 4002-4008, green micro-pixel sensors 4102-4108, and blue micro-pixel sensors 4112-4118).

Figure 5:
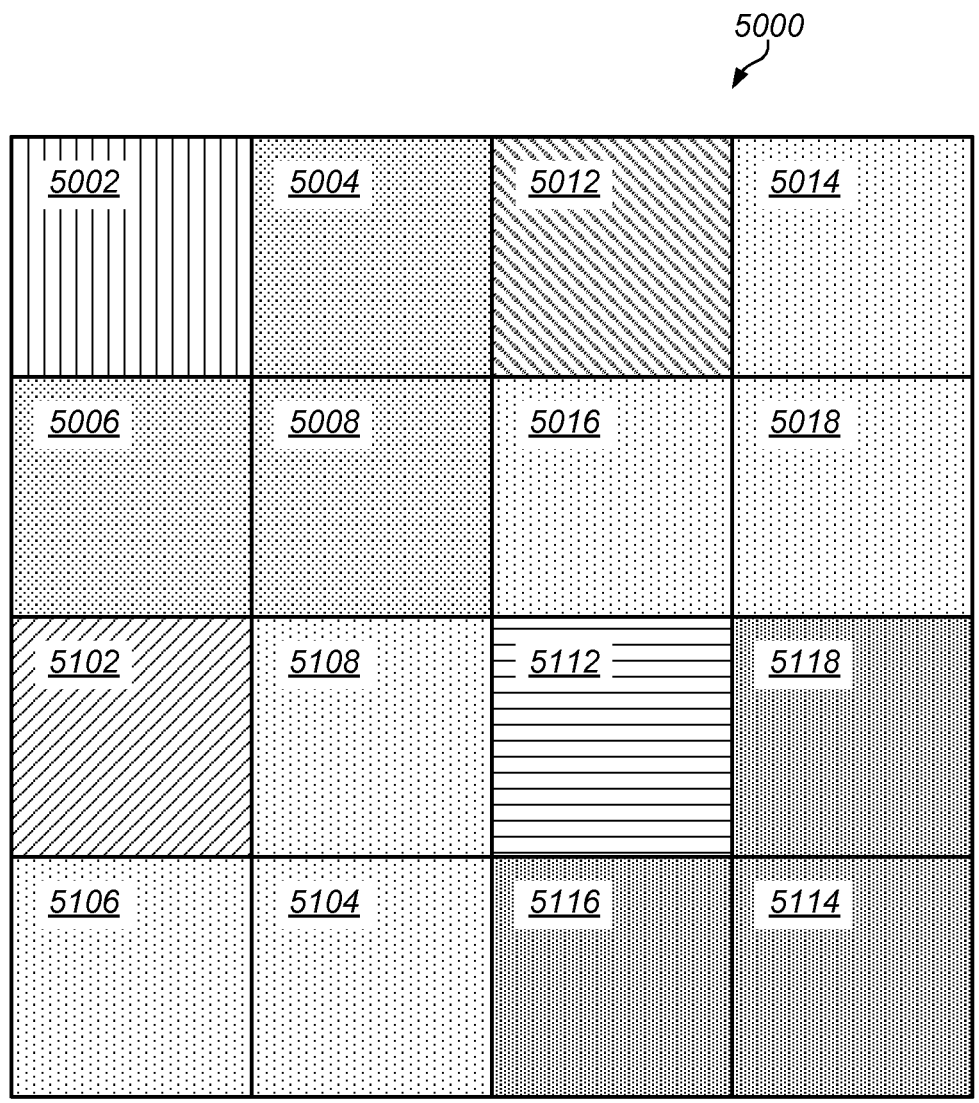
FIG. 5 illustrates a pixel array representing an embodiment of an image sensor that may, for example, be used to provide depth mapping with polarization and focus pixels in small form factor cameras, according to at least some embodiments.

FIG. 5 illustrates a pixel array representing an embodiment of an image sensor that may, for example, be used to provide depth mapping with polarization and focus pixels in small form factor cameras, according to at least some embodiments. Some embodiments include a super-pixel sensor 5000 including a plurality of micro-pixel sensors 5002-5118. A plurality of color filters (not shown) is affixed at locations for filtering light directed to a first set of micro-pixel sensors 5004-5008 (red), 5014-5018 (green), 5104-5108 (green), and 5114-5118 (blue) including one or more of the plurality of micro-pixel sensors 5002-5118. A plurality of polarization filters 5002, 5012, 5102 and 5112 is also affixed at locations for filtering light directed to a second set of micro-pixel sensors beneath gratings 5002, 5012, 5102 and 5112 including one or more of the plurality of micro-pixel sensors 5002-5118.

In some embodiments, certain micropixel sensors 5002-5118 of the plurality of micropixel sensors 5002-5118 share a floating diffusion node (not shown), and a camera module including the super-pixel sensor 5000 also includes a plurality of micro-lenses (not shown) affixed to an image sensor structure at an angle calculated to direct light to ones of the plurality of micro-pixel sensors 5002-5118. In some embodiments, each of the plurality of micro-lenses directs light to locations on a respective one or more of the plurality of micro-pixel sensors.

In some embodiments the one or more polarization filters include 5002, 5012, 5102 and 5112 gratings aligned for filtering light of a first polarization 5002, gratings aligned for filtering light of a second polarization orthogonal to the first polarization 5112, gratings aligned for filtering light of a third polarization 5102 halfway between the first polarization and the second polarization, and gratings aligned for filtering light of a fourth polarization antiparallel to the third polarization 5012.

In some embodiments, a quantity of the polarization micro-pixel sensors including the one or more of the plurality of micro-pixel sensors for capturing depth map data 5002, 5012, 5102 and 5112 is greater than quantities of the one or more of the plurality of micro-pixel sensors for capturing color image data 5004-5008 and 5114-5118 for each color of a plurality of two colors captured by the plurality of micro-pixel sensors for capturing color image data and less than a quantity of one or more of the plurality of micro pixel sensors for capturing color image data for a third color 5014-5018 and 5104-5108 captured by the plurality of micro-pixel sensors.

In some embodiments, the camera module includes a circuit (not shown) for adding output of the plurality of polarization micropixel sensors for use as a simulated intensity pixel sensor.

In some embodiments, the camera module includes a circuit (not shown) for adding output of the plurality of polarization micropixel sensors for use as a simulated intensity pixel sensor and doubling the output of the simulated intensity pixel sensor to compensate for light loss through the polarization filters.

Figure 6:
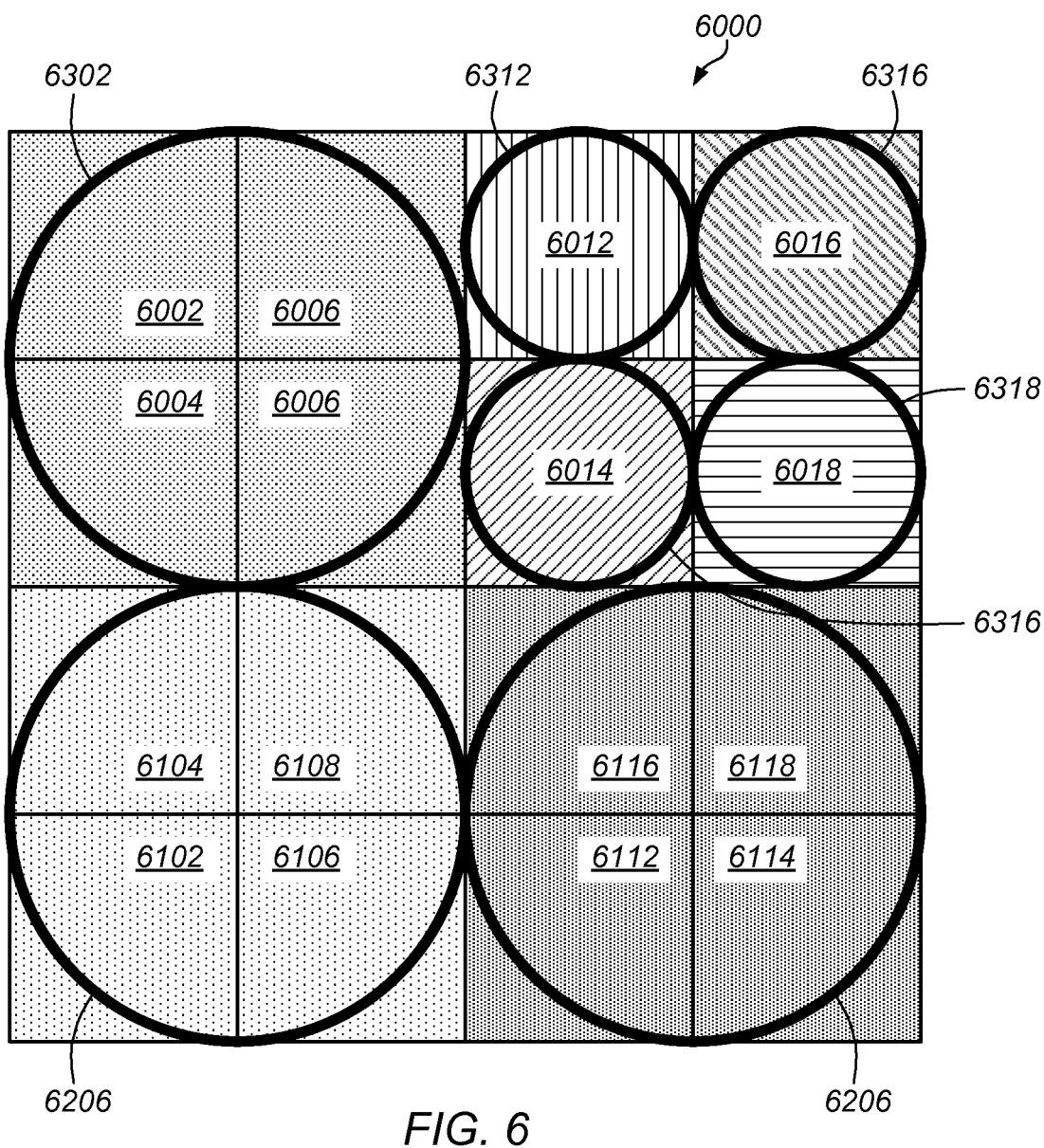
FIG. 6 depicts a pixel array with microlenses representing an embodiment of an image sensor that may, for example, be used to provide depth mapping with polarization and focus pixels in small form factor cameras, according to at least some embodiments.

FIG. 6 depicts a pixel array with microlenses representing an embodiment of an image sensor that may, for example, be used to provide depth mapping with polarization and focus pixels in small form factor cameras, according to at least some embodiments. An image sensor structure for capturing visible light intensity and polarization data is presented. In some embodiments, a super-pixel sensor 6000 includes a plurality of micro-pixel sensors 6002-6118. In some embodiments, a plurality of micro-lenses (6302, 6312-6318, 6206, and 6216) is affixed to focus light on the plurality of micro-pixel sensors 6002-6118. In some embodiments, each micro-lens of the plurality of micro-lenses (6302, 6312-6318, 6206, and 6216) directs light to locations on a respective one or more of the plurality of micro-pixel sensors 6002-6118.

In some embodiments, one or more color filters (not shown) is affixed at locations for filtering light directed by the micro-lenses (6302, 6206, and 6216) to a first set of color image micro-pixel sensors 6002-6118 including one or more of the plurality of micro-pixel sensors for capturing color image data 6002-6008 and 6102-6118. In some embodiments, one or more polarization filters 6012-6018 is affixed at locations for filtering light directed by the micro-lenses 6312-6318 to a second set of polarization micro-pixel sensors including one or more of the plurality of micro-pixel sensors 6002-6118 for capturing depth map data 6012-6018.

In some embodiments, the one or more polarization filters 6312-6318 include gratings including lithographically deposited tungsten, or another suitable material, such as aluminum. In some embodiments, the one or more polarization filters include gratings aligned for filtering light of a first polarization (e.g., n-s at micropixel sensor 6012), and gratings aligned for filtering light of a polarization orthogonal to the first polarization (e.g., e-w at micropixel sensor 6018). As shown in FIG. 4, the gratings further include gratings aligned for filtering light of a third polarization (e.g., at micropixel sensor 6016) halfway between the first polarization and the second polarization, and gratings aligned for filtering light of a fourth polarization antiparallel to the third polarization (e.g., at micropixel sensor 6014).

In some embodiments, the one or more polarization filters 6312-6318 include one or more polarization filters affixed at locations for filtering light directed by respective individual ones of the micro-lenses 6312-6318 to individual ones of the set of polarization micro-pixel sensors 6012-6018.

In some embodiments, a quantity of the polarization micro-pixel sensors 6012-6018 including the one or more of the plurality of micro-pixel sensors for capturing depth map data 6012-46018 is equal to quantities of the one or more of the plurality of micro-pixel sensors for capturing color image data for each color of a plurality of colors captured by the plurality of micro-pixel sensors for capturing color image data (e.g., the quantity of each of red micro-pixel sensors 6002-6008, green micro-pixel sensors 4102-6108, and blue micro-pixel sensors 6112-6118).

In some embodiments, a quantity of the polarization micro-pixel sensors 6012-6018 including the one or more of the plurality of micro-pixel sensors for capturing depth map data 6012-6018 is equal to a quantity of the one or more of the plurality of micro-pixel sensors for capturing color image data for a color of a plurality of colors captured by the plurality of micro-pixel sensors for capturing color image data (e.g., the quantity of any of red micro-pixel sensors 6002-6008, green micro-pixel sensors 6102-6108, and blue micro-pixel sensors 6112-6118).

Figure 7:
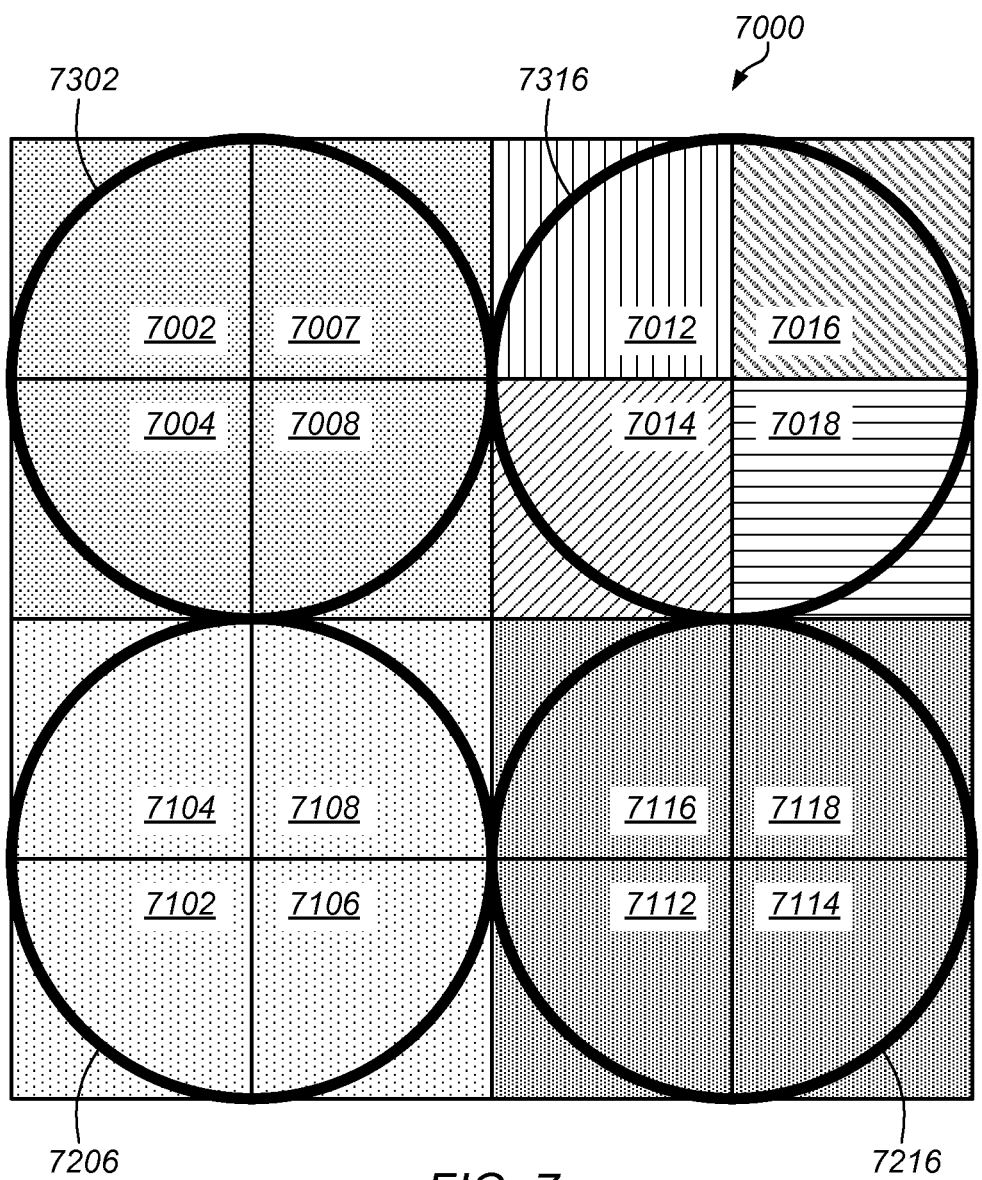
FIG. 7 illustrates a pixel array with microlenses representing an embodiment of an image sensor that may, for example, be used to provide depth mapping with polarization and focus pixels in small form factor cameras, according to at least some embodiments.

FIG. 7 illustrates a pixel array with microlenses representing an embodiment of an image sensor that may, for example, be used to provide depth mapping with polarization and focus pixels in small form factor cameras, according to at least some embodiments. An image sensor structure for capturing visible light intensity and polarization data is presented. In some embodiments, a super-pixel sensor 7000 includes a plurality of micro-pixel sensors 7002-7118. In some embodiments, a plurality of micro-lenses (7302, 7316, 7206, and 7216) is affixed to focus light on the plurality of micro-pixel sensors 7002-7118. In some embodiments, each micro-lens of the plurality of micro-lenses (7302, 7316, 7206, and 7216) directs light to locations on a respective one or more of the plurality of micro-pixel sensors 7002-7118.

In some embodiments, one or more color filters is affixed at locations for filtering light directed by the micro-lenses (7302, 7316, 7206, and 7216) to a first set of color image micro-pixel sensors 7002-7008, 7102-7118 including one or more of the plurality of micro-pixel sensors for capturing color image data 7002-7008 and 7102-7118. In some embodiments, one or more polarization filters 7012-7018 is affixed at locations for filtering light directed by one or more of the micro-lenses 7316 to a second set of polarization micro-pixel sensors including one or more of the plurality of micro-pixel sensors 7012-7118 for capturing depth map data 7012-7118.

In some embodiments, the one or more polarization filters 7012-7018 include gratings including lithographically deposited tungsten, or another suitable material, such as aluminum. In some embodiments, the one or more polarization filters include gratings aligned for filtering light of a first polarization (e.g., n-s at micropixel sensor 7012), and gratings aligned for filtering light of a polarization orthogonal to the first polarization (e.g., e-w at micropixel sensor 7018). As shown in FIG. 7, the gratings further include gratings aligned for filtering light of a third polarization (e.g., at micropixel sensor 7016) halfway between the first polarization and the second polarization, and gratings aligned for filtering light of a fourth polarization antiparallel to the third polarization (e.g., at micropixel sensor 7014).

In some embodiments, a quantity of the polarization micro-pixel sensors 7012-7018 including the one or more of the plurality of micro-pixel sensors for capturing depth map data 7012-7018 is equal to quantities of the one or more of the plurality of micro-pixel sensors for capturing color image data for each color of a plurality of colors captured by the plurality of micro-pixel sensors for capturing color image data (e.g., the quantity of each of red micro-pixel sensors 7002-7008, green micro-pixel sensors 7102-7108, and blue micro-pixel sensors 7112-7118).

Figure 8A:
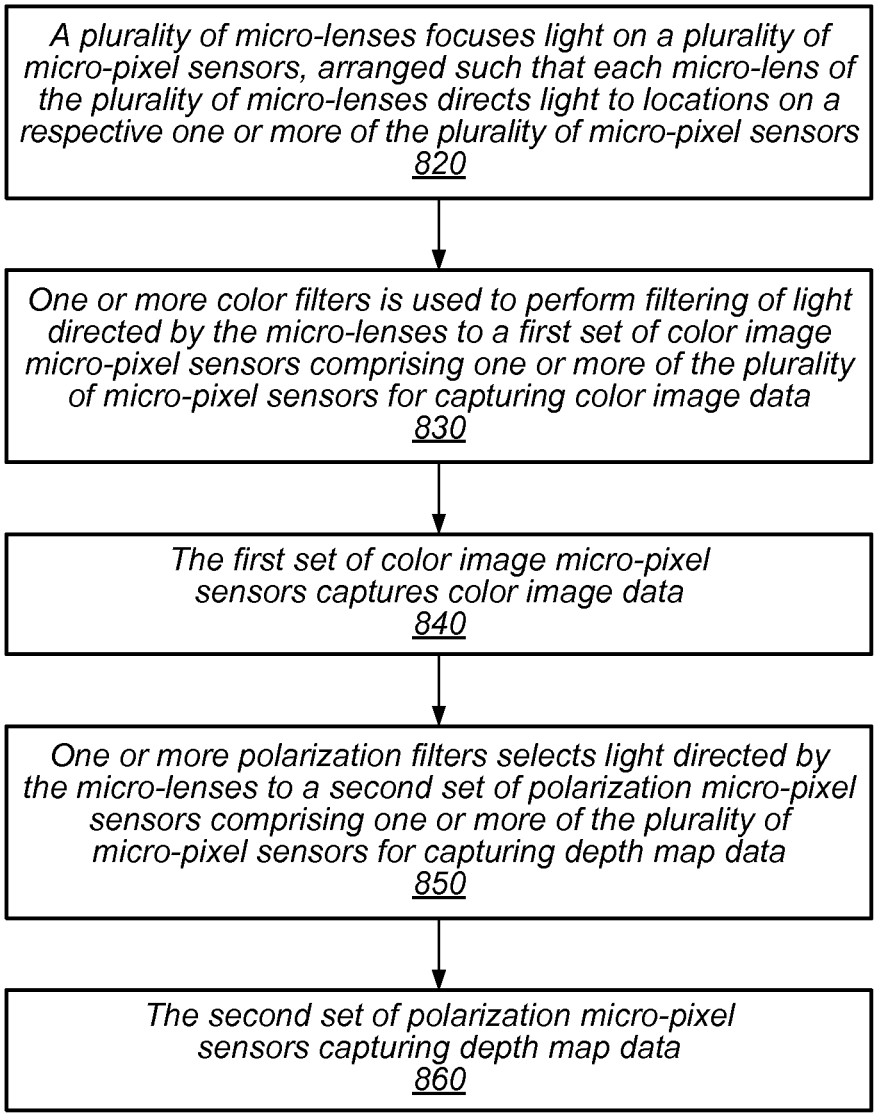
FIG. 8A is a flowchart of a method to provide depth mapping with polarization and focus pixels, according to at least some embodiments.

FIG. 8A is a flowchart of a method to provide depth mapping with polarization and focus pixels, according to at least some embodiments. A plurality of micro-lenses focuses light on a plurality of micro-pixel sensors, arranged such that each micro-lens of the plurality of micro-lenses directs light to locations on a respective one or more of the plurality of micro-pixel sensors (block 820). One or more color filters is used to perform filtering of light directed by the micro-lenses to a first set of color image micro-pixel sensors including one or more of the plurality of micro-pixel sensors for capturing color image data (block 830). The first set of color image micro-pixel sensors captures color image data (block 840). One or more polarization filters filters light directed by the micro-lenses to a second set of polarization micro-pixel sensors including one or more of the plurality of micro-pixel sensors for capturing depth map data (block 850). The second set of polarization micro-pixel sensors captures depth map data (block 860).

Figure 8B:
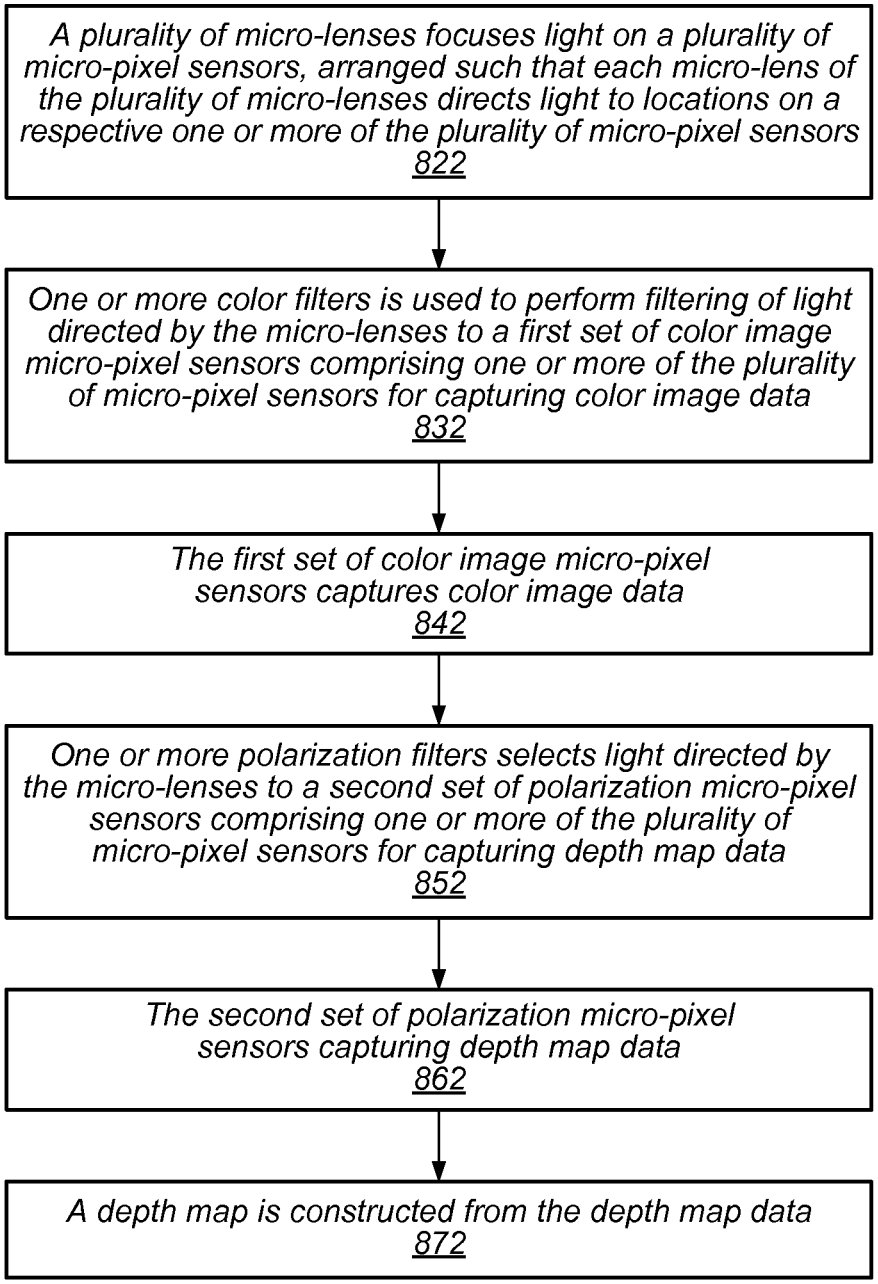
FIG. 8B is a flowchart of a method to provide depth mapping with polarization and focus pixels, according to at least some embodiments.

FIG. 8B is a flowchart of a method to provide depth mapping with polarization and focus pixels, according to at least some embodiments. A plurality of micro-lenses focuses light on a plurality of micro-pixel sensors, arranged such that each micro-lens of the plurality of micro-lenses directs light to locations on a respective one or more of the plurality of micro-pixel sensors (block 822). One or more color filters is used to perform filtering of light directed by the micro-lenses to a first set of color image micro-pixel sensors including one or more of the plurality of micro-pixel sensors for capturing color image data (block 832). The first set of color image micro-pixel sensors captures color image data (block 842). One or more polarization filters filters light directed by the micro-lenses to a second set of polarization micro-pixel sensors including one or more of the plurality of micro-pixel sensors for capturing depth map data (block 852). The second set of polarization micro-pixel sensors capturing depth map data (block 862). A depth map is constructed from the depth map data (block 872).

Figure 9:
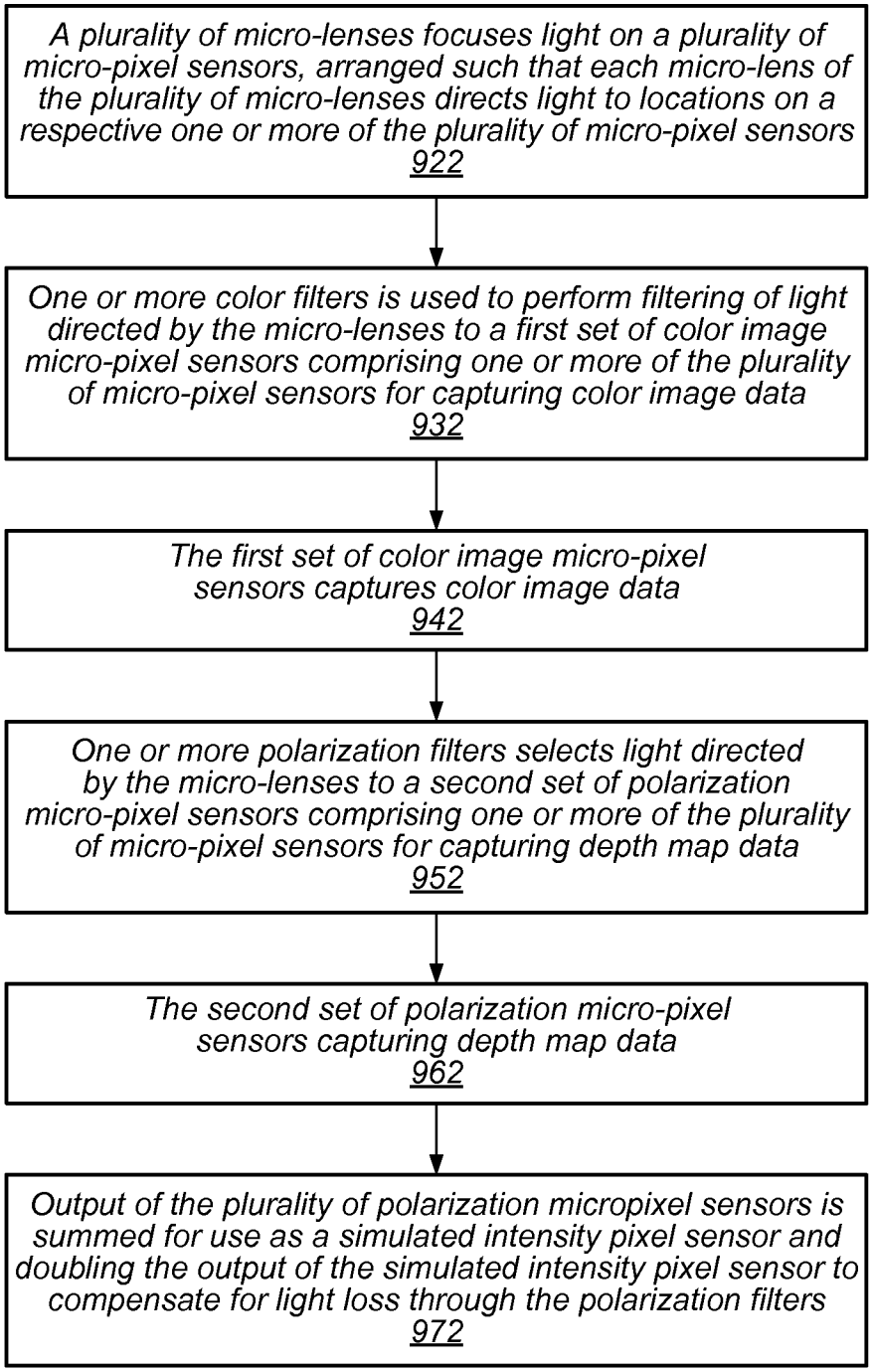
FIG. 9 is a flowchart of a method to provide depth mapping with polarization and focus pixels, according to at least some embodiments.

FIG. 9 is a flowchart of a method to provide depth mapping with polarization and focus pixels, according to at least some embodiments. A plurality of micro-lenses focuses light on a plurality of micro-pixel sensors, arranged such that each micro-lens of the plurality of micro-lenses directs light to locations on a respective one or more of the plurality of micro-pixel sensors (block 922). One or more color filters is used to perform filtering of light directed by the micro-lenses to a first set of color image micro-pixel sensors including one or more of the plurality of micro-pixel sensors for capturing color image data (block 932). The first set of color image micro-pixel sensors captures color image data (block 942). One or more polarization filters filters light directed by the micro-lenses to a second set of polarization micro-pixel sensors including one or more of the plurality of micro-pixel sensors for capturing depth map data (block 952). The second set of polarization micro-pixel sensors capturing depth map data (block 962). Output of the plurality of polarization micropixel sensors is summed for use as a simulated intensity pixel sensor and doubling the output of the simulated intensity pixel sensor to compensate for light loss through the polarization filters (block 972).

Figure 10:
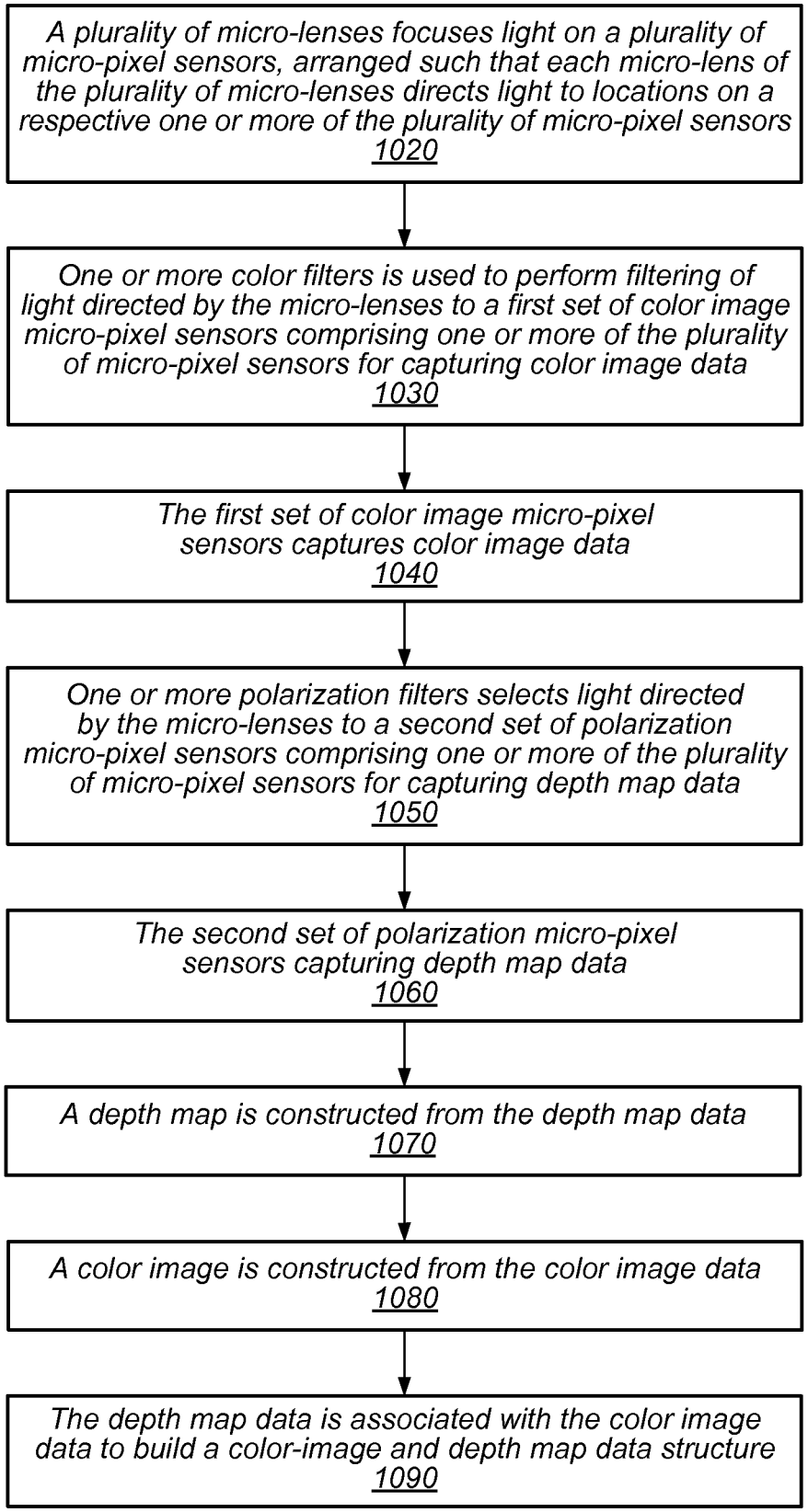
FIG. 10 is a flowchart of a method to provide depth mapping with polarization and focus pixels, according to at least some embodiments.

FIG. 10 is a flowchart of a method to provide depth mapping with polarization and focus pixels, according to at least some embodiments. A plurality of micro-lenses focuses light on a plurality of micro-pixel sensors, arranged such that each micro-lens of the plurality of micro-lenses directs light to locations on a respective one or more of the plurality of micro-pixel sensors (block 1020). One or more color filters is used to perform filtering of light directed by the micro-lenses to a first set of color image micro-pixel sensors including one or more of the plurality of micro-pixel sensors for capturing color image data (block 1030). The first set of color image micro-pixel sensors captures color image data (block 1040). One or more polarization filters filters light directed by the micro-lenses to a second set of polarization micro-pixel sensors including one or more of the plurality of micro-pixel sensors for capturing depth map data (block 1050). The second set of polarization micro-pixel sensors capturing depth map data (block 1060). A depth map is constructed from the depth map data (block 1070). A color image is constructed from the color image data (block 1080). The depth map data is associated with the color image data to build a color-image and depth map data structure (block 1090).

Example Computer System

Figure 11:
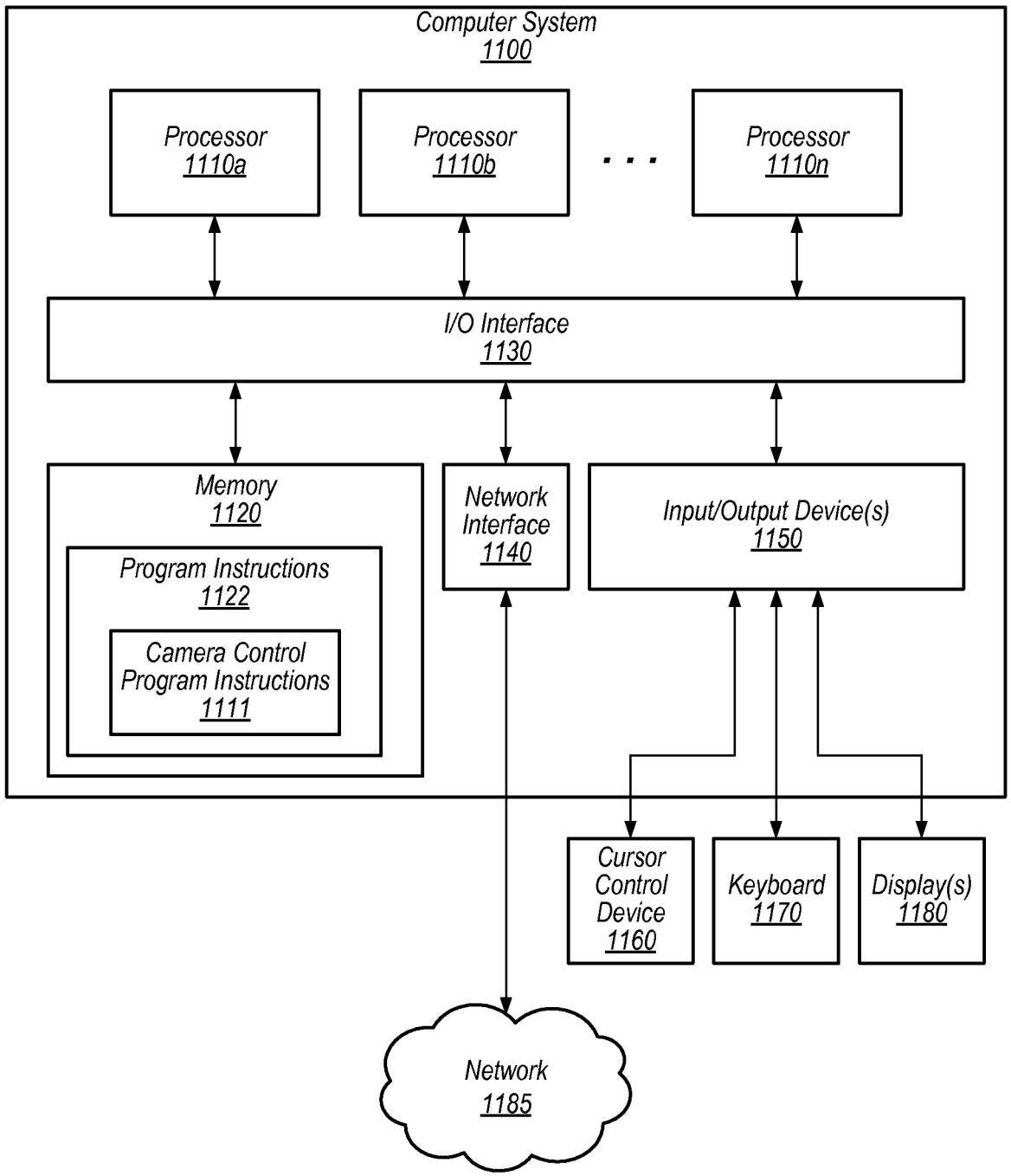
FIG. 11 illustrates an example computer system configured to implement aspects of the system and method for camera control with depth mapping with polarization and focus pixels, according to some embodiments.

FIG. 11 illustrates an example computer system 1100 that may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of depth mapping sensing, as described herein may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store camera control program instructions 1122 and/or camera control data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement a lens control application 1124 incorporating any of the functionality described above. Additionally, existing camera control data 1132 of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An image sensor structure for capturing light intensity and polarization data, comprising:
   a super-pixel sensor comprising a plurality of micro-pixel sensor groups;
   a plurality of micro-lenses affixed to focus light on a plurality of micro-pixel sensors, wherein each micro-lens of the plurality of micro-lenses directs light to locations on a respective one or more of the plurality of micro-pixel sensors;
   a plurality of filters of a plurality of filter types affixed at locations for filtering light directed by the micro-lenses to the micro-pixel sensors, the plurality of filter types comprising:
      a plurality of color filter types for capturing color image data for respective ones of a plurality of colors; and
      a plurality of polarization filter types including a first polarization filter type and a second polarization filter type of a different polarization than the first polarization filter type, for capturing depth map data;
   wherein the plurality of micro-pixel sensor groups comprises:
      a first micro-pixel sensor group comprising a first plurality of contiguous micro-pixel sensors of the plurality of micro-pixel sensors, wherein multiple contiguous micro-pixel sensors of the first plurality of contiguous micro-pixel sensors are configured to receive light filtered by a same type of the plurality of color filter types; and
      a second micro-pixel sensor group, contiguous to the first micro-pixel sensor group, comprising a second plurality of contiguous micro-pixel sensors of the plurality of micro-pixel sensors configured to receive light filtered by at least two different types of the plurality of filter types including at least one of the plurality of polarization filter types;
      wherein the contiguous first and second micro-pixel sensor groups are collectively configured to receive light filtered by filters of the first polarization filter type and the second polarization filter type of a different polarization than the first polarization filter type.

2. The image sensor structure of claim 1, wherein the plurality of polarization filters comprise:
   gratings comprising lithographically deposited tungsten.

3. The image sensor structure of claim 1, wherein the plurality of polarization filters comprise:
   gratings aligned for filtering light of a first polarization, and
   gratings aligned for filtering light of a polarization orthogonal to the first polarization.

4. The image sensor structure of claim 1, wherein the plurality of polarization filters comprise
   a plurality of polarization filters affixed at locations for filtering light directed by respective individual ones of the micro-lenses to individual ones of the set of polarization micro-pixel sensors.

5. The image sensor structure of claim 1, wherein the plurality of polarization filters polarization filters comprise
   a plurality of polarization filters affixed at locations for filtering light directed by one of the micro-lenses affixed to focus light on an individual one of the plurality of micro-pixel sensor groups.

6. The image sensor structure of claim 1, wherein
   a quantity of the polarization micro-pixel sensors is equal to quantities of the color image micro-pixel sensors for each color of the plurality of colors.

7. The image sensor structure of claim 1, comprising
   the plurality of micro-pixel sensor groups each further comprising one or more of the first set of color image micro-pixel sensors and one of the second set of polarization micro-pixel sensors;
   wherein a quantity of the polarization micro-pixel sensors is equal to a quantity of the plurality of micro-pixel sensor groups.

8. A camera module, comprising:
   a super-pixel sensor comprising a plurality of micro-pixel sensor groups;
   a plurality of filters of a plurality of filter types affixed at locations for filtering light directed to a plurality of micro-pixel sensors, the plurality of filter types comprising:
      a plurality of color filter types for capturing color image data for respective ones of a plurality of colors; and
      a plurality of polarization filter types including a first polarization filter type and a second polarization filter type of a different polarization than the first polarization filter type, for capturing depth map data;
   wherein the plurality of micro-pixel sensor groups comprises:
      a first micro-pixel sensor group comprising a first plurality of contiguous micro-pixel sensors of the plurality of micro-pixel sensors, wherein multiple contiguous micro-pixel sensors of the first plurality of contiguous micro-pixel sensors are configured to receive light filtered by a same type of the plurality of color filter types; and
      a second micro-pixel sensor group, contiguous to the first micro-pixel sensor group, comprising a second plurality of contiguous micro-pixel sensors of the plurality of micro-pixel sensors configured to receive light filtered by at least two different types of the plurality of filter types including at least one of the plurality of polarization filter types;
      wherein the contiguous first and second micro-pixel sensor groups are collectively configured to receive light filtered by filters of the first polarization filter type and the second polarization filter type of a different polarization than the first polarization filter type.

9. The camera module of claim 8, further comprising:
   a plurality of micro-lenses affixed to an image sensor structure at an angle calculated to direct light to the plurality of micro-pixel sensors, wherein each of the plurality of micro-lenses directs light to locations on a respective one or more of the plurality of micro-pixel sensors;
   wherein the plurality of micro-pixel sensors for one or more of the micro-pixel sensor groups share a floating diffusion node.

10. The camera module of claim 8, the plurality of polarization filters comprising:
    gratings aligned for filtering light of a first polarization,
    gratings aligned for filtering light of a second polarization orthogonal to the first polarization, gratings aligned for filtering light of a third polarization halfway between the first polarization and the second polarization, and gratings aligned for filtering light of a fourth polarization antiparallel to the third polarization.

11. The camera module of claim 8, wherein
a quantity of the second set of polarization micro-pixel sensors is equal to quantities of the first set of color image micro-pixel sensors for each color of the plurality of colors.

12. The camera module of claim 8,
the plurality of micro-pixel sensor groups each further comprising one or more of the first set of color image micro-pixel sensors and one of the second set of polarization micro-pixel sensors;
wherein a quantity of the second set of polarization micro-pixel sensors is equal to a quantity of the plurality of micro-pixel sensor groups.

13. The camera module of claim 8, further comprising
a plurality of micro-lenses affixed at locations to an image sensor structure at an angle calculated to direct light to the plurality of micro-pixel sensor groups, wherein each of the plurality of micro-pixel sensor groups shares a common micro-lens.

14. The camera module of claim 8, further comprising
a plurality of micro-lenses affixed to an image sensor structure at an angle calculated to direct light to the plurality of micro-pixel sensors, wherein each of the plurality of micro-lenses directs light to locations on a respective one or more of the plurality of micro-pixel sensors;
wherein each of the plurality of polarization filters is affixed at a location for filtering light directed by a micro-lens to an individual micro-pixel sensor, and
wherein individual ones of the first set of color image micro-pixel sensors belonging to the same one of the plurality of super-pixel sensor groups share a common micro-lens.

15. The camera module of claim 8, further comprising
a circuit for adding output of each of the second set of polarization micro-pixel sensors for use as a simulated intensity pixel sensor.

16. The camera module of claim 8, further comprising
a circuit for adding output of each of the second set of polarization micro-pixel sensors for use as a simulated intensity pixel sensor and adjusting the output of the simulated intensity pixel sensor to compensate for light loss through the polarization filters.

17. A method, comprising:
focusing light, by a plurality of micro-lenses, on a plurality of micro-pixel sensor groups comprising respective contiguous pluralities of micro-pixel sensors, wherein each micro-lens of the plurality of micro-lenses directs light to locations on a respective one or more of the respective pluralities of micro-pixel sensors though a plurality of filters of a plurality of filter types including a plurality of color filter types and a plurality of polarization filter types;

filtering light, by one or more color filters of the plurality of color filter types for respective ones of a plurality of colors, directed by the micro-lenses to a first set of color image micro-pixel sensors of the respective pluralities of micro-pixel sensors for capturing color image data;

capturing color image data by the first set of color image micro-pixel sensors;

filtering light, by one or more polarization filters of the plurality of polarization filter types, directed by the micro-lenses to a second set of polarization micro-pixel sensors of the respective pluralities of micro-pixel sensors for capturing depth map data, wherein the plurality of polarization filter types comprises a first polarization filter type and a second polarization filter type of a different polarization than the first polarization filter type; and capturing depth map data by the second set of polarization micro-pixel sensors;

wherein the plurality of micro-pixel sensor groups comprises:
a first micro-pixel sensor group comprising a first plurality of contiguous micro-pixel sensors of the plurality of micro-pixel sensors, wherein multiple contiguous micro-pixel sensors of the first plurality of contiguous micro-pixel sensors are configured to receive light filtered by a same type of the plurality of color filter types; and
a second micro-pixel sensor group, contiguous to the first micro-pixel sensor group, comprising a second plurality of contiguous micro-pixel sensors of the plurality of micro-pixel sensors configured to receive light filtered by at least two different types of the plurality of filter types including at least one of the plurality of polarization filter types;
wherein the contiguous first and second micro-pixel sensor groups are collectively configured to receive light filtered by filters of the first polarization filter type and the second polarization filter type of a different polarization than the first polarization filter type.

18. The method of claim 17, further comprising:
constructing a depth map from the depth map data.

19. The method of claim 17, further comprising:
constructing a depth map from the depth map data;
constructing a color image from the color image data; and
associating the depth map data with the color image data to build a color-image and depth map data structure.

20. The method of claim 17, further comprising:
adding output of each of the plurality of polarization micro-pixel sensors for use as a simulated intensity pixel sensor and adjusting the output of the simulated intensity pixel sensor to compensate for light loss through the polarization filters.

* * * * *